G. A. UNGAR.
FLEXIBLE COUPLING.
APPLICATION FILED JAN. 9, 1917.

1,302,248.

Patented Apr. 29, 1919.
3 SHEETS—SHEET 1.

INVENTOR
G. A. Ungar
BY
Duell, Warfield & Duell
ATTORNEY

UNITED STATES PATENT OFFICE.

GUSTAV A. UNGAR, OF CLEVELAND, OHIO, ASSIGNOR TO F. R. BLAIR & CO., INC., OF NEW YORK, N. Y., A CORPORATION OF NEW YORK.

FLEXIBLE COUPLING.

1,302,248.  Specification of Letters Patent.  Patented Apr. 29, 1919.

Application filed January 9, 1917. Serial No. 141,363.

*To all whom it may concern:*

Be it known that I, GUSTAV A. UNGAR, a subject of the Emperor of Austria, residing at Cleveland, in the county of Cuyahoga and State of Ohio, have invented certain new and useful Improvements in Flexible Couplings, of which the following is a full, clear, and exact description, such as will enable others skilled in the art to which it appertains to make and use the same.

This invention relates to power transmission mechanism, and with respect to its more specific features, to flexible couplings adapted to serve as torque transmitting devices.

One of the objects of the invention is the provision of a flexible coupling adapted to efficiently transmit the torque.

Another object of the invention is the provision of a flexible disk capable of efficiently transmitting the torque, and which will not readily buckle to an extent to impair its efficiency.

Another object of the invention is the provision of a practical connection between a flexible disk and a driving and a driven member, whereby the strain engendered by the torque is applied over a substantial portion of the disk and the connection is maintained throughout the life of the coupling.

Another object of this invention is to facilitate the assembling of the coupling and to prevent serious accident in case the disks should give way.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings forming part of this specification, and wherein similar reference characters refer to similar parts throughout the several views,—

Referring now more specifically to the drawings, the numeral 1 indicates a rotatable driving shaft, and the numeral 2 is a rotatable driven shaft coaxial therewith. These shafts may be regarded as pertaining to any form of rotary power transmitting device, as for instance, the power transmission shaft between the motor and the axle gears of an automobile, wherein it is not uncommon to support the driving shaft 1 in such a manner that its plane of rotation moves or vibrates angularly relative to the plane of rotation of the driven shaft 2. For the purpose of transmitting torque from one shaft to the other a driving member is provided on each shaft with an intermediate flexible torque transmitting element between them. Each of the driving members is connected to the torque transmitting element in such a manner as to produce a tractive effect at circumferentially spaced points around the elements, but in order to permit a certain variation in the position of the axes of the two shafts, the tractive points at which the one driving element is connected to the torque transmitting element are circumferentially spaced from the tractive points at which the other driving element is connected to the torque transmitting element. In the present embodiment each shaft is provided with arms or cranks 3 and 4, forming spiders of several arms each, in the present instance three. A flexible annular disk is provided to which the spider arms are connected, the points of connection of one spider to the disk alternating with those of the other around the rotary axis.

The arms 3 and 4 may be connected to the disk by clamping the disk to the arms by means of clamping members 5, and the clamping members, disks and arms may be held together by holding means, including tension members $5^a$ extending through the disk, having means for engaging the arms and the clamping members. It is within the broad scope of this invention that any number of tension members may be employed for each clamping member, but certain practical advantages are accomplished by providing a plurality, as for example, two.

When the shaft 1 is rotated, the shaft 2 will be driven through the instrumentality of the flexible disk, while the disk permits angular variation or movement of the plane of rotation of the shafts and arms relative to each other while still transmitting the torque. The flexible disk may be made as thick as necessary efficiently to transmit the required torque. In the present embodiment this thickness is obtained by employing a plurality of the flexible disks, as two, indicated at 6, 6.

To secure the coöperation of the disks in transmitting the torque without interfering with the flexibility of the coupling there are preferably provided between the disks, spacing washers 7, 7, which may conveniently be of such form that one washer will fit over both the tension members with which each arm is connected to the disks.

With a coupling of this type, it is desirable that the torque shall be transmitted by pressure on the lateral faces of the disk rather than by the pressure of the tension members on the edges of perforations through the disk. To insure this, means are provided to distribute the stress of the tension member over a substantial part of the area of the disk and also to prevent the loosening of the holding means under the influence of jar or vibration in use, and furthermore, the surfaces of the arms 3 and 4, the clamping members 5 and the washers 7, where they engage the disk, are roughened, as shown at $7^a$, so that they may securely engage the disk.

Figure 1:
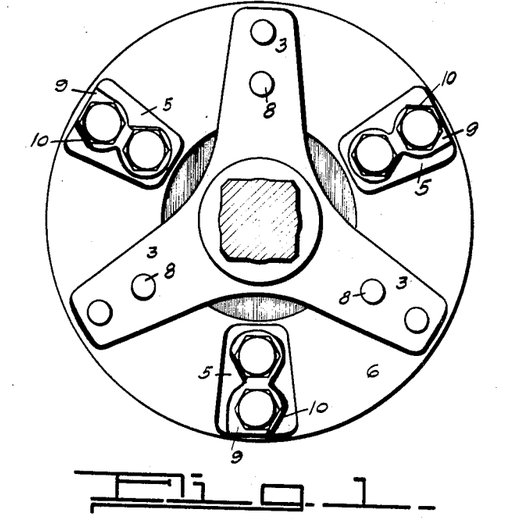
Figure 1 is an end view of a device embodying the invention.
Figure 2:
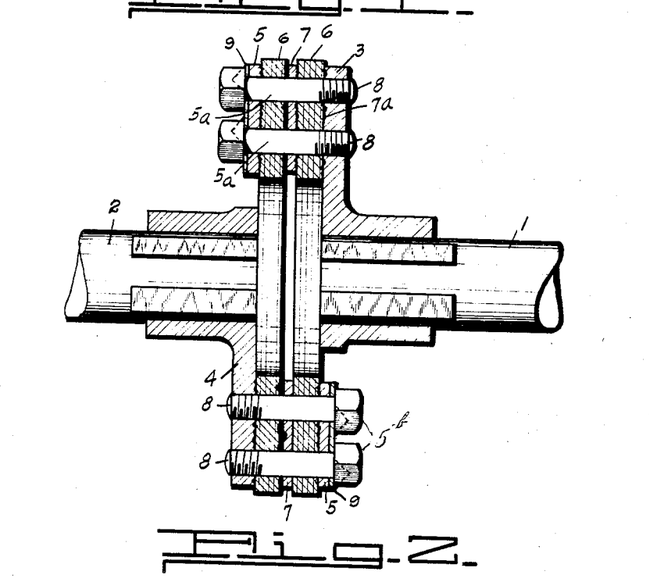
Fig. 2 is a vertical section of Fig. 1.

In the construction illustrated in Figs. 1 and 2, the form of tension members employed comprises studs 8 passing through the clamping members and the disks and screwing into the arms of the spiders, the heads $5^b$ of the studs constituting members rotatable to tighten or loosen the holding means.

Figure 11:
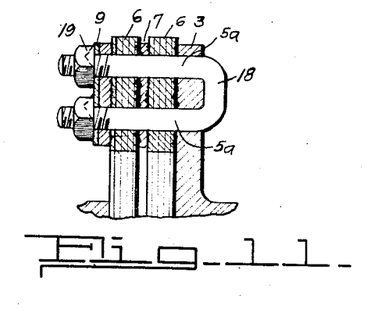
Fig. 11 is a view showing the modified form of connection between the spider and the disks.

In the modification illustrated in Fig. 11 the tension members are the legs of U-bolts 18 which pass through the clamping members, the disk and the arms, and carry nuts 19 on the free ends of the legs, rotatable to tighten or loosen the connection.

Figure 4:
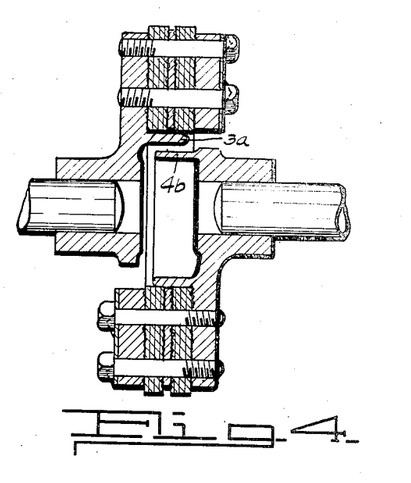
Fig. 4 is a vertical section of Fig. 3.

It will be seen that the clamping members 5 are of substantial thickness, those illustrated, for instance in Fig. 4, being of the same thickness as the clamping portion, or jaw, of the spider arm. It will also be observed that these jaws clamp the larger portion of the width of the annulus, or flexible disk, radially of the disk. In this wise a large portion of the area of the flexible disk is between the jaws referred to, and upon the institution of the clamping action the pressure is transmitted to this large area in a uniform manner, the rigid jaws operating to take the normal clamping strain without substantial deflection.

In order to insure that the torque shall continue to be transmitted by the pressure on the lateral faces of the disk, locking means is provided to prevent the loosening of the holding means, which locking means is so arranged that it is held rigidly in order that the holding means may be locked thereto. When the holding means is adapted to be tightened and loosened by rotation of a rotatable member, as in the constructions illustrated, this locking means may comprise a washer engaging the rotatable member of the holding means and simultaneously engaging another portion of the coupling to prevent rotation of the washer around the holding means. The washers may be adapted to engage various portions of the coupling as well as the holding means they are intended to lock, but a practical way of preventing movement of the washers and at the same time locking a plurality of holding means with simplicity is to make the washers of such shape that one washer may engage a plurality of tension members, so that each washer is positively restrained from movement and a plurality of holding means may be locked with the same washer. Where a plurality of tension members are employed for each arm, as in the forms illustrated, the washer may fit over two or more of the tension members of one arm and lock them both. In the construction of Fig. 1, where the tension members comprise stud bolts 8, the washer 9 may fit under the heads of the bolts and have a portion 10 bent up against a flat face of the bolt head. In the construction of Fig. 11 the washer 9 may be under the nuts on the free ends of the U-bolts and have a portion 10 bent up against a flat face of the nut. By locking one bolt against the other, the tendency for the bolt to back out, due to vibrations in the mechanism, is avoided. Thus the compression which is exerted upon the disks when the coupling is first set up is maintained throughout the life of the coupling.

Figure 3:
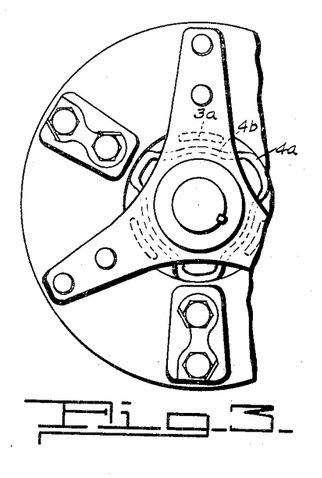
Fig. 3 is an end view of a modification.

In the modification illustrated in Figs. 3 and 4 there is provided, on each of the arms of one spider, as 3, an inwardly projecting boss 3ª at such position as just to fit within and preferably support the edge of the inner opening of the disk when the latter is in place. These bosses, therefore, serve to center and hold the disk in place during the assembling of the coupling, as well as performing another function later to be described. On the spider 4, in this modification, there is provided an annular flange 4ª. This flange, at the arms 4, is of an external diameter to fit within and preferably support the edge of the inner opening of the disk similar to the bosses 3ª, and centers the disk but between the arms 4 the flange is offset inwardly, as shown at 4ᵇ, a sufficient amount so that when the coupling is assembled, the portion 4ᵇ will lie inside of and radially sufficiently spaced from the bosses 3ª, to permit ready flexing of the coupling. By this construction it will be evident that if the disks should break, the bosses 3ª and flange 4ª will retain the parts substantially in place and enable the parts to act as a universal joint, thereby preventing the danger which might otherwise attend a failure of the disks at high speed.

Figure 5:
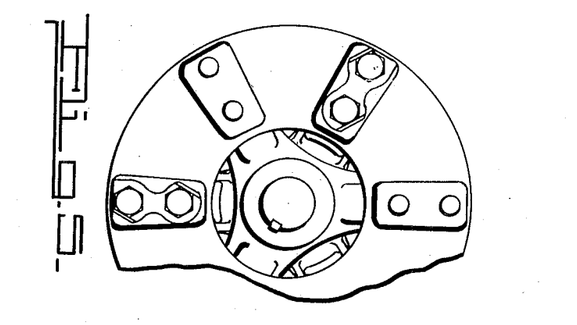
Fig. 5 is an end view showing another modification.
Figure 6:
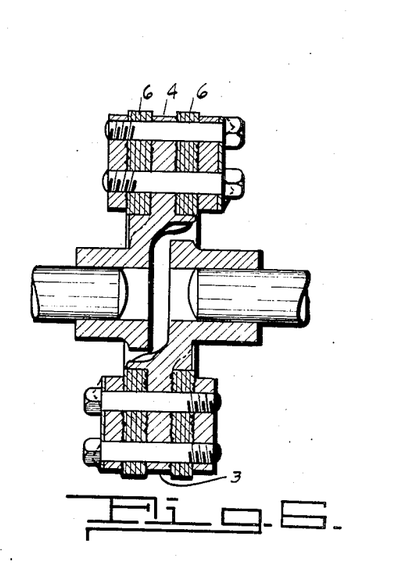
Fig. 6 is a vertical section of Fig. 5.
Figure 7:
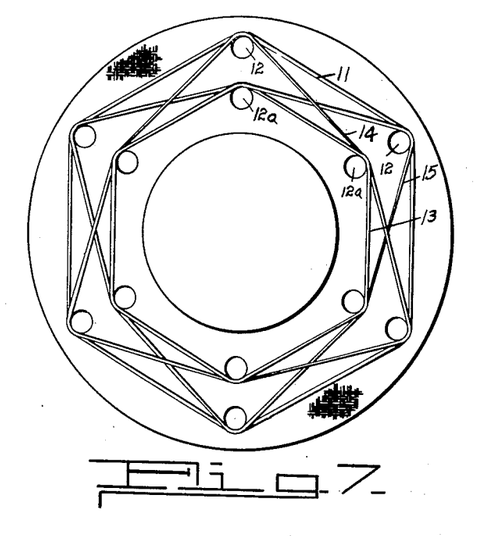
Fig. 7 is a face view of the flexible disk with an outer plate removed, certain tension threads being enlarged for clearer disclosure.
Figure 8:
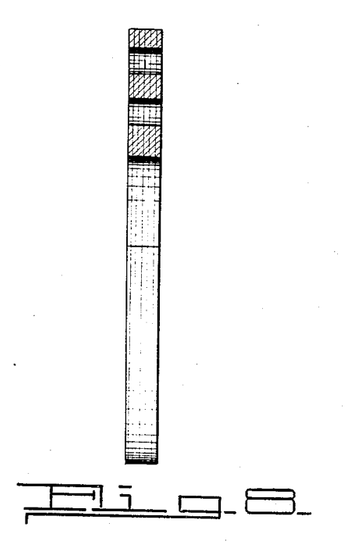
Fig. 8 is an edge view of the flexible disk.

In the modification illustrated in Figs. 5 and 6, the arms 3 and 4 lie in the same plane, and the flexible disks 6, 6 are fastened to one or, as illustrated, both of the outer sides of the arms. This makes a very compact arrangement for the coupling.

To augment the strength of the disk against circumferential strain, tension members may be secured thereto, preferably in positions to extend between the openings for the studs of one spider and the holes for the studs of the other. These tension members may be of different materials and arranged in different ways, and in the embodiment illustrated consist of strong linen thread of about the same thickness as the threads comprising the textile plates hereinafter referred to. An outer main tension thread 11 extends successively circumferentially around the outer series of openings 12 for the studs 8, another, or inner main tension thread 13 extends around the inner series of the openings 12ª, and auxiliary tension threads 14 and 15 extend successively around the alternate outer and inner openings, crossing each other between the openings for the arms of different shafts.

Figure 9:
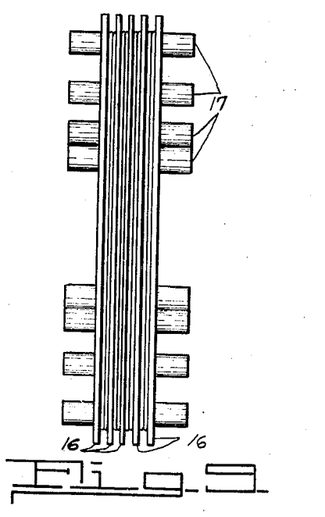
Fig. 9 is a diagrammatic vertical sectional view of the flexible disk, showing a step in the making, with the associated plates and tension threads separated.
Figure 10:
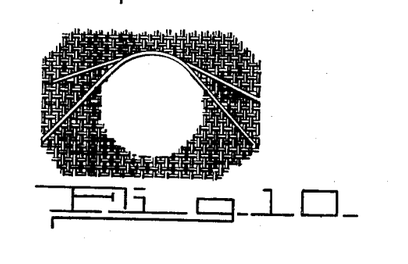
Fig. 10 is a detail of a portion of the disk around one of the openings through which certain connecting devices pass, showing a tension thread of exaggerated thickness, for clearer disclosure.

Viewed in some aspects, the disks may be made of any suitable material, but in the practical preferred form illustrated, each disk is made of a plurality of plates, or laminæ, of textile fabric, such as canvas. Each textile plate indicated at 16, has the several transverse openings referred to cut therethrough. The warp and weft plate threads, as distinguished from the independent tension threads, thus terminate at the edges of the openings, as seen in Fig. 6. The canvas plates may be rubberized, or may be coated on their opposite faces with rubber, and the main and auxiliary tension threads referred to are disposed between the laminæ. As shown in Fig. 9, the plates are supported on alining pins 17, these pins being of the same shape and diameter as the tension members 5ª of the connections, and disposed relatively in the same way. In constructing this disk first, an outer canvas plate is threaded on the alining pins, then if the auxiliary tension threads are to be used, the main and auxiliary tension threads are wound around the alining pins in the manner shown in Fig. 3, and then another canvas plate is threaded on the alining pins, and so on. This second plate preferably has its warp and woof parallel to the warp and woof of the first plate. Having assembled the number of plates and tension threads required to make a disk of desired thickness, the plates are strongly pressed together and vulcanized while under pressure, being thus caused to adhere. The tension threads are thus bound in position between the laminæ, said threads being in contact with the rubber and embedded in the plates to a certain extent. The openings in the plates are preferably larger than the pins 17, so that after the disk has been vulcanized, a surface of rubber will lie on the inner surface of each opening.

In assembling the coupling, one or more of the flexible coupling disks 6 are superposed with the spacing washers therebetween and secured to the arms or cranks 3 and 4 by the studs 8 and clamping plates 5. Upon rotating the shaft 1, the shaft 2 will be rotated through the medium of the flexible disks. Should the axis of the shaft 1 vibrate, or move at an angle to that of the shaft 2, thus changing the angular relation between the planes of rotation of the shafts and respective spiders, the disk will yield or buckle sufficiently to permit the change, as will readily be perceived. The main tension threads 18 and 19 being straight members disposed between the arms of different spiders in practical alinement with the lines of stress in the disk between successive arms act to, as it were, pull the disks around at symmetrically disposed areas thereof assisted by the auxiliary tension threads and mesh of the laminæ.

The action of the projections or pins upon a considerable portion of the width of the annular portion of the disk prevents any substantial buckling immediately around a clamped portion of the disk, and the buckling will be relegated to the portions between the connection for one arm and the connection for another, the disk buckling or bending more readily at a point midway between the connections and less readily as the points of connection are approached, and the bending or buckling will take place uniformly practically over the full width of the annular portion, or at least uniformly over so much of the width as is comprised between the extreme outer and inner edges of the connecting members passing through the disks. This ample width of the disk subject to uniform flexion, while permitting the angular relationship referred to, to vary, resists such buckling or bending even under undue strains, so that the joint resulting is highly efficient and not apt to collapse.

Thus by the above described construction are accomplished, among others, the objects hereinbefore referred to.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

Having described my invention, what I claim as new and desire to secure by Letters Patent is:

1. A device of the character described comprising, in combination, two driving members, a flexible torque transmitting element, means adapted to cause a tractive effect between each of said members and said torque transmitting element at circumferentially spaced points around the element, including attaching means having rotative parts and a locking element adapted to lock mutually a plurality of said rotative parts.

2. A device of the character described comprising, in combination, two driving members, a flexible torque transmitting element, means adapted to cause a tractive effect between each of said members and said torque transmitting element at circumferentially spaced points around the element by pressure on the face of the element comprising clamping means connected to said driving members respectively, said clamping means comprising rotative parts, and a locking element adapted to lock mutually at least two of said rotative parts.

3. In devices of the character described, in combination, a driving member and a driven member, each comprising a spider having arms, a plurality of flexible disks, and means for connecting each of said spider arms to said disks so that torque is transmitted from one spider to the other through the disks comprising a plurality of holding members for each arm, said disks being maintained in spaced relation to each other.

4. In devices of the character described, in combination, a driving member and a driven member, each comprising a spider having arms, a plurality of flexible disks, means for connecting each of said spiders to said disks so that torque is transmitted from one spider to the other through the disks, and means for maintaining said disks in spaced relation to each other comprising washers having roughened faces in engagement with the disks.

5. In devices of the character described, in combination, a driving member and a driven member, each comprising a spider having arms, a flexible disk, and means for connecting each arm of said spiders to said disk so that torque is transmitted from one spider to the other through the disk, said spiders having roughened faces in engagement with the disk.

6. In devices of the character described, in combination, a driving member and a driven member, each comprising a spider having arms, a flexible disk, and means for connecting each arm of said spiders to said disk so that torque is transmitted from one spider to the other through the disk comprising a plurality of holding members for each arm, said spiders having roughened faces in engagement with the disk.

7. In devices of the character described, in combination, a driving member and a driven member, each comprising a spider having arms, a flexible disk, and means for attaching each of said arms to said disk so that torque is transmitted from one spider to the other through the disk comprising a plurality of holding members for each arm.

8. In devices of the character described, in combination, a driving member and a driven member, each comprising a spider having arms, a flexible disk, means for attaching each of said arms to said disk, so that torque is transmitted from one spider to the other through the disk comprising a clamping member and a plurality of holding members for clamping said disk firmly between said arm and said clamping member, said holding members each comprising a member rotatable to tighten or loosen the hold of the holding member, and means for mutually locking the rotatable members of each arm against rotation.

9. In devices of the character described, in combination, a driving member and a driven member, each comprising a spider having arms, a plurality of flexible disks, means for attaching each of said arms to said disks, so that torque is transmitted from one spider to the other through the disks comprising a clamping member and a plurality of holding members for clamping said disks firmly between said arms and said clamping member, said holding members each comprising a member rotatable to tighten or loosen the hold of the holding member, means for mutually locking the rotatable members of each arm against rotation, and means for holding said disks in spaced relation comprising washers on said holding means.

10. In devices of the character described, in combination, a driving member and a driven member, each comprising a spider having arms, a flexible disk, means for attaching each of said arms to said disk, so that torque is transmitted from one spider to the other through the disk comprising a clamping member and a plurality of holding members for clamping said disk firmly between said arm and said clamping member, each holding member comprising a rotatable member, and a lock washer for each arm adapted to engage rotatable members of one arm to lock them against rotation.

11. In devices of the character described, in combination, a driving member and a driven member, each comprising a spider having arms, a flexible disk between said spiders, means for attaching each of said arms to said disk so that torque is transmitted from one spider to the other through the disk comprising a clamping member and a plurality of holding members for clamping said disk firmly between said arm and said clamping member, said holding members each comprising a rotatable member rotatable to tighten or loosen the hold of the holding member, and means for mutually locking a plurality of rotatable members against rotation, the said arms and said clamping members each having rough faces in engagement with the disk.

12. In devices of the character described, in combination, a driving member and a driven member, each comprising a spider having arms, a plurality of flexible disks, means for spacing said disks comprising a member having roughened faces in engagement with the disks so that torque is transmitted from one spider to the other through the disks, means for attaching each of said arms to said disks comprising a clamping member, and a plurality of holding members for clamping said disks firmly between said arm and said clamping member, said holding members each comprising a member rotatable to tighten or loosen the hold of the holding member, and means to mutually lock a plurality of rotatable members against rotation, the said arms and said clamping members each having rough faces in engagement with the disk.

13. A device of the character described comprising, in combination, a driving member and a driven member, each comprising a spider having a plurality of arms, a flexible disk to which each of said arms is attached, said members having means adapted to engage, on failure of the disk, to hold the members substantially in alinement.

14. A device of the character described comprising, in combination, a driving member and a driven member, each comprising a spider having a plurality of arms, a disk to which each of said arms is attached, one of said members having bosses adapted to fit the inner opening of said disk.

15. A device of the character described comprising, in combination, a driving member and a driven member, each comprising a spider having a plurality of arms, a disk to which each of said arms is attached, one of said members having bosses adapted to fit the inner opening of said disk, the other of said members having a flange adapted to fit the inner opening of said disk and to be radially spaced from said bosses.

16. A torque transmitting member comprising, in combination, a plurality of superposed textile plates having coincident transverse openings spaced apart around the rotary axis, in the edges of which openings the plate threads terminate, said plates being secured together by a binder, and a lining for each of said transverse openings composed of the binder.

17. A device of the character described comprising, in combination, a driving member, a driven member and a disk, means for attaching each of said members to said disk comprising holding members passing through transverse openings in said disk, said disk being composed of plates of textile material having transverse openings of greater diameter than the said holding members, and a binder for holding said plates together and for filling the space between the edges of the openings in said textile plates and said holding members.

18. A torque transmitting member comprising, in combination, a flexible laminated disk having transverse openings spaced apart around the rotary axis, and a flexible tension member embedded therein and extending from one opening to another spaced therefrom as aforesaid, and partly around said latter openings.

19. A torque transmitting member comprising, in combination, a flexible laminated disk having transverse openings spaced apart around the rotary axis, and a flexible tension member between adjacent laminæ, extending from one opening to another spaced therefrom as aforesaid and partly around said latter openings.

20. A torque transmitting member comprising, in combination, a flexible laminated disk having transverse openings spaced apart around the rotary axis, the laminæ of said disk composed of textile fabric, and a flexible tension member between adjacent laminæ extending from one opening to another spaced therefrom as aforesaid and partly around said latter openings.

21. A torque transmitting member comprising, in combination, a flexible laminated disk having transverse openings spaced apart around the rotary axis, and a flexible tension member between adjacent laminæ extending successively from one opening to another around said axis.

22. A torque transmitting member comprising, in combination, a flexible laminated disk having sets of transverse openings spaced apart around the rotary axis, the openings of respective sets being at different distances from said axis, and tension threads between adjacent laminæ extending from one opening to another.

23. A torque transmitting member comprising, in combination, a flexible laminated disk having sets of transverse openings spaced apart around the rotary axis, the openings of respective sets being at different distances from said axis, and tension threads between adjacent laminæ extending from one opening to another and partly around the edges of said latter openings.

24. A torque transmitting member comprising, in combination, a flexible laminated disk having sets of transverse openings spaced apart around the rotary axis, the openings of respective sets being at different distances from said axis, and tension threads between adjacent laminæ extending from one outer opening to another outer opening and from one inner opening to another inner opening and partly around the edge of each of said last-mentioned openings.

25. A torque transmitting member comprising, in combination, a plurality of superposed textile plates secured together and having a plurality of coincident transverse openings spaced apart around the rotary axis, in the edges of which openings the plate threads terminate, and independent tension threads extending between the spaced openings.

26. A torque transmitting member comprising, in combination, a plurality of superposed textile plates secured together and having coincident transverse openings spaced apart around the rotary axis, in the edges of which openings the plate threads terminate, and independent tension threads between the laminæ extending between the spaced openings and partly around the edges of said openings.

27. In a device of the character described, in combination, a rotatable driving shaft, a rotatable driven shaft, said shafts being arranged to permit the axis of rotation of one to move angularly to the axis of rotation of the other, a flexible annular disk intersecting the axes of rotation of said shafts, and means adapted to connect said shafts to said disk, one at a different point from another around said axes, comprising means rotatable with one of said shafts and passing through said disk, said first mentioned means having direct rotary thrust against the lateral face of said disk for a substantial portion of the width of the disk.

28. In a device of the character described, in combination, a rotatable driving shaft, a rotatable driven shaft, said shafts being arranged to permit the axis of rotation of one to move angularly to the axis of rotation of the other, a flexible disk intersecting the axes of rotation of said shafts, having transverse openings at different radial distances from the axis of rotation, and means adapted to connect said shafts to said disk, one at a different point from another around said axes, comprising a plurality of pins connected to one of said shafts and passing through the openings in said disk, one pin through an opening at a different distance from the axis from the pin in another opening.

29. In a device of the character described, in combination, a rotatable driving shaft, a rotatable driven shaft, said shafts being arranged to permit the axis of rotation of one to move angularly to the axis of rotation of the other, a flexible disk intersecting the axes of rotation of said shafts, having transverse openings at different radial distances from the axis of rotation, and means adapted to connect said shafts to said disk, one at a different point from another around said axes, comprising a plurality of pins connected to each of said shafts and passing through and fitting radially differently spaced openings in said disk.

30. In a device of the character described, in combination, a rotatable driving shaft, a rotatable driven shaft, said shafts being arranged to permit the axis of rotation of one to move angularly with relation to the axis of rotation of the other, a flexible annular disk composed of laminæ of textile fabric secured together, the plane of which disk intersects the axes of rotation of said shafts, said disk having a plurality of pairs of transverse openings spaced around the axes of rotation, the openings of respective pairs being at different radial distances from said axes, arms rotatable with said shafts, a plurality of pins carried by each arm, the pins of one arm occupying one pair of said openings and the pins of the other arms occupying other pairs of said openings, respectively, and tension threads secured between the laminæ extending from a pin of an arm of one shaft to a pin of an arm of the other and partly around and bearing against said last-mentioned pins.

31. In a device of the character described, in combination, a rotatable driving shaft, a rotatable driven shaft, said shafts being arranged to permit the axis of rotation of one to move angularly with relation to the axis of rotation of the other, a flexible annular disk composed of laminæ of textile fabric secured together, the plane of which disk intersects the axes of rotation of said shafts, said disk having a plurality of pairs of transverse openings spaced around the axes of rotation, the openings of respective pairs being at different radial distances from said axes, arms rotatable with said shafts, a plurality of pins carried by each arm, the pins of one arm occupying one pair of said openings and the pins of the other arms occupying other pairs of said openings, respectively, and tension threads secured between the laminæ, extending from the pins of an arm of one shaft to the pins of an arm of the other, and bearing against said last-mentioned pins.

32. A device of the character described comprising, in combination, a driving member and a driven member each comprising a spider having arms, a flexible disk to transmit torque between the arms of one member and those of the other, and means for attaching said disk to an arm comprising a plurality of bolts passing through said disk, nuts for said bolts, and a washer engaging said bolts and having portions adapted to be bent into engagement with said nuts to lock them against rotation.

33. A device of the character described comprising, in combination, two driving members, a flexible torque transmitting element, means adapted to cause a tractive effect between each of said members and said torque transmitting element at circumferentially spaced points around the element by pressure on the face of the element comprising respective clamping members for each of said points and a plurality of holding members for each clamping member.

34. A device of the character described comprising, in combination, two driving members, a flexible torque transmitting element, means adapted to cause a tractive effect between each of said members and said torque transmitting element at circumferentially spaced points around the element by pressure on the face of the element comprising respective clamping members for each of said points and a plurality of holding members for each clamping member, said holding members penetrating said disk.

35. A device of the character described comprising, in combination, two driving members, a flexible torque transmitting element, means adapted to cause a tractive effect between each of said members and said torque transmitting element at circumferentially spaced points around the element by pressure on the face of the element comprising respective clamping members for each of said points and a plurality of holding members for each clamping member, said driving members having means adapted to engage, on failure of the disk, to hold said driving members in substantial alinement.

36. In a torque-transmitting flexible coupling, in combination, a flexible disk, clamping jaws between which said disk is disposed, and means adapted to effect clamping of the disk between the jaws comprising a plurality of bolts extending through said disk and one of said jaws, one of said bolts being spaced from another transversely of the line of torque strain, said last mentioned jaw comprising a rigid member adapted to positively clutch said disk.

37. In a torque-transmitting flexible coupling, in combination, a flexible disk, clamping jaws between which said disk is disposed, and means adapted to effect clamping of the disk between the jaws comprising a plurality of bolts extending through said disk and one of said jaws, one of said bolts being spaced from another transversely of the line of torque strain, said last mentioned jaw comprising a rigid member adapted to positively clutch said disk, nuts for said bolts, and a washer through which at least two bolts pass, adapted to lock said nuts.

38. In a torque-transmitting flexible coupling, in combination, a flexible disk, clamping jaws between which said disk is disposed, and means adapted to effect clamping of the disk between the jaws comprising a plurality of tension members extending through said disk and one of said jaws, one of said tension members being spaced from another transversely of the line of torque strain, said last mentioned jaw comprising a rigid member adapted to positively clutch said disk.

39. A device of the character described comprising, in combination, a rotary driving member, a rotary driven member, a flexible disk connected to said members, to one independently of the other, whereby upon rotation torque is transmittted from one member to the other through the disk, and means adapted to coöperate with the periphery of said disk to center the same on one of said members.

40. A device of the character described comprising, in combination, a rotary driving member, a rotary driven member, a flexible disk connected to said members, to one independently of the other, whereby upon rotation torque is transmitted from one member to the other through the disk, and means carried by each member adapted to coöperate with the periphery of said disk to center the same on said members.

In testimony whereof I affix my signature, in the presence of two witnesses.

GUSTAV A. UNGAR.

Witnesses:
  H. M. SEAMANS,
  WILLIS B. RICE.